( 12 ) United States Patent
Koes

(10) Patent No.: US 12,362,080 B2
(45) Date of Patent: Jul. 15, 2025

US012362080B2

(54) THERMOSETTING THERMALLY CONDUCTIVE DIELECTRIC COMPOSITE

(71) Applicant: ROGERS CORPORATION, Chandler, AZ (US)

(72) Inventor: Thomas A. Koes, Riverside, CA (US)

(73) Assignee: ROGERS CORPORATION, Chandler, AZ (US)

( * ) Notice: Subject to any disclaimer, the term of this patent is extended or adjusted under 35 U.S.C. 154(b) by 549 days.

(21) Appl. No.: 17/788,807

(22) PCT Filed: Jan. 13, 2021

(86) PCT No.: PCT/US2021/013223
§ 371 (c)(1),
(2) Date: Jun. 29, 2022

(87) PCT Pub. No.: WO2021/146274
PCT Pub. Date: Jul. 22, 2021

(65) Prior Publication Data
US 2023/0052719 A1 Feb. 16, 2023

Related U.S. Application Data

(60) Provisional application No. 62/961,265, filed on Jan. 15, 2020.

(51) Int. Cl.
C08K 3/36 (2006.01)
B32B 7/025 (2019.01)
B32B 15/092 (2006.01)
C08J 5/24 (2006.01)
C08K 3/38 (2006.01)
C08K 5/5435 (2006.01)
C08K 7/14 (2006.01)
H01B 3/40 (2006.01)

(52) U.S. Cl.
CPC ............... H01B 3/40 (2013.01); B32B 7/025 (2019.01); B32B 15/092 (2013.01); C08J 5/244 (2021.05); C08K 3/36 (2013.01); C08K 3/38 (2013.01); C08K 7/14 (2013.01); C08J 2363/00 (2013.01)

(58) Field of Classification Search
CPC .......... C08K 3/36; C08K 3/38; C08K 5/5435; C08K 2003/385; C08K 2201/003; C08K 2201/014; C08J 5/249
See application file for complete search history.

(56) References Cited

U.S. PATENT DOCUMENTS

| | | |
|---|---|---|
| 8,658,719 B2 | 2/2014 | Chang et al. |
| 10,123,412 B2 | 11/2018 | Leach |
| 10,418,148 B2 | 9/2019 | Chang et al. |
| 2010/0028689 A1* | 2/2010 | Yung ................. B05D 7/16 427/58 |
| 2014/0004324 A1 | 1/2014 | Hsieh et al. |
| 2014/0353004 A1 | 12/2014 | Jung et al. |
| 2015/0299457 A1 | 10/2015 | Fu |
| 2016/0115343 A1* | 4/2016 | Takahara ............. H01L 23/36 257/77 |
| 2017/0218171 A1* | 8/2017 | Leach ................. H05K 3/00 |
| 2017/0283645 A1 | 10/2017 | Sakaguchi et al. |
| 2018/0163015 A1 | 6/2018 | Takezawa et al. |
| 2020/0032064 A1* | 1/2020 | Kawahara ............ B32B 27/26 |
| 2021/0280371 A1* | 9/2021 | Wang ................ C08L 83/14 |

OTHER PUBLICATIONS

International Search Report; International Application No. PCT/US2021/013223; International Filing Date: Jan. 13, 2021; Date of Mailing: Apr. 12, 2021; 4 pages.
Written Opinion; International Application No. PCT/US2021/013223; International Filing Date: Jan. 13, 2021; Date of Mailing: Apr. 12, 2021; 9 pages.

* cited by examiner

Primary Examiner — Mohsen Ahmadi
(74) Attorney, Agent, or Firm — CANTOR COLBURN LLP

(57) ABSTRACT

In an aspect, a dielectric composite comprises a thermoset epoxy resin; a reinforcing layer; greater than or equal 40 volume percent of a hexagonal boron nitride based on the total volume of the dielectric composite minus the reinforcing layer; 3 to 7.5 volume percent of a fused silica based on the total volume of the dielectric composite minus the reinforcing layer; an epoxy silane; an accelerator; and a de-aerator. The hexagonal boron nitride can comprise a plurality of hexagonal boron nitride platelets and a plurality of hexagonal boron nitride agglomerates. A volume ratio of the hexagonal boron nitride agglomerates to the hexagonal boron nitride platelets can be 1:1.5 to 4:1.

20 Claims, No Drawings

THERMOSETTING THERMALLY CONDUCTIVE DIELECTRIC COMPOSITE

CROSS REFERENCE TO RELATED APPLICATIONS

This application is a National Stage application of PCT/US2021/013223, filed Jan. 13, 2021, which claims the benefit of U.S. Provisional Application Ser. No. 62/961,265, filed Jan. 15, 2020 both of which are incorporated by reference in their entirety herein.

BACKGROUND

Circuit subassemblies are used in the manufacture of single-layer circuits and multilayer circuits, and include, for example, circuit laminates, bond plies, resin-coated electrically conductive layers, and cover films, as well as packaging substrate laminates and build-up materials. Each of the foregoing subassemblies contains a layer of a dielectric material. As electronic devices and the features thereon become smaller, thermal management of the resulting dense circuit layouts becomes increasingly important. A number of efforts have been made to improve the thermal conductivity of the circuit laminates by incorporating thermally conductive particulate fillers in the dielectric layer. Although adding large amounts of thermally conductive particulate fillers has been shown to increase the thermal conductivity, increased amounts of thermally conductive particulate fillers can adversely affect one or more of the mechanical properties of the dielectric layer.

Accordingly, there remains a need in the art for improving thermal conductivity of the circuit laminates without suffering unacceptable tradeoffs in other properties.

BRIEF SUMMARY

Disclosed herein is a thermally conductive dielectric composite.

In an aspect, a dielectric composite comprises a thermoset epoxy resin; a reinforcing layer; greater than or equal 40 volume percent of a hexagonal boron nitride based on the total volume of the dielectric composite minus the reinforcing layer; 3 to 7.5 volume percent of a fused silica based on the total volume of the dielectric composite minus the reinforcing layer; an epoxy silane; an accelerator; and a de-aerator. The hexagonal boron nitride can comprise a plurality of hexagonal boron nitride platelets and a plurality of hexagonal boron nitride agglomerates. A volume ratio of the hexagonal boron nitride agglomerates to the hexagonal boron nitride platelets can be 1:1.5 to 4:1; or 1:1 to 3.5:1; or 1.5:1 to 3.5:1, or 2.5:1 to 3.5:1. The plurality of hexagonal boron nitride platelets can have a $D_{10}$ particle size by volume of less than or equal to 6 micrometers, a $D_{50}$ particle size by volume of 7 to 18 micrometers, and a $D_{90}$ particle size by volume of greater than or equal to 20 micrometers. The plurality of hexagonal boron nitride agglomerates can have a $D_{10}$ particle size by volume of 20 to 50 micrometers, a $D_{50}$ particle size by volume of 50 to 80 micrometers, and a $D_{90}$ particle size by volume of 90 to 140 micrometers.

In another aspect, a dielectric composite comprises 5 to 20 weight percent of a glass reinforcing layer based on the total weight of the dielectric composite; 40 to 50 volume percent of a thermoset epoxy resin based on the total volume of the dielectric composite minus the glass reinforcing fabric; wherein the thermoset epoxy resin comprises an epoxy functional phenol-formaldehyde novolac and a 9,10-dihydro-9-oxa-10-phosphaphenanthrene-10-oxide (DOPO) functional bisphenol A Phenol-Formaldehyde novolac; greater than or equal 40 volume percent of a hexagonal boron nitride based on the total volume of the dielectric composite minus the reinforcing layer; 3 to 7.5 volume percent of a fused silica based on the total volume of the dielectric composite minus the glass reinforcing layer; wherein the fused silica has an average particle size of 5 to 10 micrometers; 0.5 to 2 weight percent of an epoxy silane based on the total weight of the dielectric composite minus the glass reinforcing fabric; 0.001 to 1, or 0.005 to 0.5 weight percent of an aryl-imidazole accelerator based on the total weight of the dielectric composite minus the glass reinforcing fabric; and 0.1 to 1, or 0.3 to 0.8 weight percent of a de-aerator based on the total weight of the dielectric composite minus the glass reinforcing fabric; wherein the hexagonal boron nitride comprising a plurality of hexagonal boron nitride platelets and a plurality of hexagonal boron nitride agglomerates; wherein a volume ratio of the hexagonal boron nitride agglomerates to the hexagonal boron nitride platelets is 1:1.5 to 4:1; or 1:1 to 3.5:1; or 1.5:1 to 3.5:1, or 2.5:1 to 3.5:1; wherein the plurality of hexagonal boron nitride platelets has a $D_{10}$ particle size by volume of less than or equal to 6 micrometers, a $D_{50}$ particle size by volume of 7 to 18 micrometers, and a $D_{90}$ particle size by volume of greater than or equal to 20 micrometers; wherein the plurality of hexagonal boron nitride agglomerates has a $D_{10}$ particle size by volume of 20 to 50 micrometers, a $D_{50}$ particle size by volume of 50 to 80 micrometers, and a $D_{90}$ particle size by volume of 90 to 140 micrometers.

In yet another aspect, a multilayer article comprises a dielectric layer comprising the dielectric composite and at least one electrically conductive layer disposed on a surface of the dielectric layer.

In an aspect, a method of making the dielectric composite comprises forming a thermosetting composition comprising an epoxy monomer, a curing agent, the hexagonal boron nitride, the fused silica, the epoxy silane, the accelerator, and the de-aerator; coating the reinforcing fabric with the thermosetting composition; and at least partially curing the thermosetting composition to form the dielectric composite.

The above described and other features are exemplified by the following detailed description and claims.

DETAILED DESCRIPTION

Efficient heat transfer from high power printed circuit materials is increasingly important for enhanced performance, reliability, and design form-factor. Accordingly, there exists a need for the dielectric materials to play a more significant role in thermal management. Often, modifying formulation to increase the heat transfer of these dielectric materials is at the expense of other properties such as flowability or peel strength to copper. For example, using increased amounts of a thermally conductive filler such as boron nitride can result in a reduction in the peel strength to copper and varying the type and relative amount of the boron nitride can result in a reduction in the flowability of the uncured resin.

A dielectric composite was discovered that is capable of achieving a high thermal conductivity while maintaining a good balance of the peel strength to copper, the thermal conductivity, glass transition temperature, and the resin flow. Without intending to be bound by theory, it is believed that this certain synergy arises from the types and amounts of the boron nitride filler used in the dielectric composite. Specifically, the dielectric composite comprises a thermoset epoxy resin, a reinforcing layer, greater than or equal 40 volume percent (vol %) of a hexagonal boron nitride based on the total volume of the dielectric composite minus the reinforcing layer, 3 to 7.5 volume percent of a fused silica based on the total volume of the dielectric composite minus the reinforcing layer, an epoxy silane, an accelerator, and a de-aerator. The hexagonal boron nitride comprises a plurality of hexagonal boron nitride platelets and a plurality of hexagonal boron nitride agglomerates, where a volume ratio of the hexagonal boron nitride agglomerates to the hexagonal boron nitride platelets can be 1:1.5 to 4:1; or 1:1 to 3.5:1; or 1.5:1 to 3.5:1, or 2.5:1 to 3.5:1. The plurality of hexagonal boron nitride platelets can have a $D_{10}$ particle size by volume of less than or equal to 6 micrometers, a $D_{50}$ particle size by volume of 7 to 18 micrometers, and a $D_{90}$ particle size by volume of greater than or equal to 20 micrometers. The plurality of hexagonal boron nitride agglomerates can have a $D_{10}$ particle size by volume of 20 to 50 micrometers, a $D_{50}$ particle size by volume of 50 to 80 micrometers, and a $D_{90}$ particle size by volume of 90 to 140 micrometers.

The resultant dielectric composite can have a peel strength to copper of greater than or equal to 0.7 kilograms per centimeter (kg/cm) measured in accordance with IPC test method 650, 2.4.8 for copper-clad laminate as-received (AR) or after applying a thermal stress (AS) by heating laminate test specimens to a temperature of 288 degrees Celsius (° C.) for 10 seconds; a thermal conductivity in the z-axis of greater than or equal to 1.8 watts per meter Kelvin (W/mK) as measured in accordance with ASTM E1461-13 or ASTM D5470-12; a glass transition temperature of greater than or equal to 160° C., or 150 to 165° C., or 160 to 165° C. as measured in accordance with IPC test method 650, 2.4.25; and a resin flow of 12.5 to 25.5 millimeters (mm) as determined by measuring the overflow of partially cured resin which has been b-staged for 3 minutes at 145° C. and pressed at a pressure of 1.4 megapascals (MPa) and a temperature of 171° C.

The resultant dielectric composite can also have one or more of a good flame retardance achieving a UL94 V0 rating at 0.5 millimeters, good conductive anodic filament resistance, a high plated-through-hole quality even after drilling 480 holes with the same drill bit, good plated-through-hole reliability passing 500 cycles from −65 to 150° C., a low coefficient of thermal expansion, or a time to delamination at 288° C. of more than 120 minutes.

The dielectric composite comprises a thermoset epoxy resin. The thermoset epoxy resin can be derived from a thermosetting composition, for example, comprising an epoxy monomer. The thermosetting composition can be ionically cured or thermally cured. The thermosetting composition can comprise 40 to 60 volume percent, or 40 to 50 volume percent, or 45 to 50 volume percent of the epoxy monomer based on the total volume of the thermosetting composition. The resultant dielectric composite can likewise comprise 40 to 60 volume percent, or 40 to 50 volume percent, or 45 to 50 volume percent of the thermoset epoxy resin based on the total volume of the dielectric composite minus the reinforcing fabric.

The epoxy monomer can comprise one or more epoxy monomers. The epoxy monomers can comprise non-halogenated epoxy compounds. The epoxy monomers can comprise at least one of a glycidyl ether of an alcohol compound (for example, of at least one of butanediol, polyethylene glycol, or polypropylene glycol); a glycidyl ether of a phenol compound (for example, of at least one of bisphenol A, bisphenol F, bisphenol S, phenol novolac, cresol novolac, or resorcinol novolac); a glycidyl ether of a phenolic resin (for example, at least one of para-xylene-modified phenolic resin, meta-xylene para-xylene-modified phenolic resin, terpene modified phenolic resin, dicyclopentadiene modified phenolic resin, cyclopentadiene modified phenolic resin, polycyclic aromatic-ring-modified phenolic resin, or naphthalene-ring-containing phenolic resin); a glycidyl ester of a carboxylic acid compound (for example, of at least one of phthalic acid, isophthalic acid, or tetrahydrophthalic acid); a glycidyl or methylglycidyl epoxy monomer (for example, aniline or isocyanuric acid where an active hydrogens bonded to a nitrogen atom are substituted with glycidyl groups); an alicyclic epoxy monomer (for example, at least one of vinyl cyclohexene epoxide, 3,4-epoxycyclohexylmethyl-3,4-epoxycyclohexane carboxylate, or 2-(3,4-epoxy) cyclohexyl-5,5-spiro(3,4-epoxy)cyclohexane-m-dioxane); an epoxidized product of bis(4-hydroxy)thioether; a stilbene type epoxy monomer; or a halogenated phenol novolac type epoxy monomer. The epoxy monomer can comprise at least one of an epoxidized phenol novolac or an epoxidized cresol novolac.

The thermoset epoxy resin can comprise residues of an epoxy functional phenol-formaldehyde novolac. The epoxy functional phenol-formaldehyde novolac can be present in the thermosetting composition in an amount of 20 to 30 vol %, or 22 to 28 vol % based on the total volume of the thermosetting composition minus any reinforcing fabric. The epoxy functional phenol-formaldehyde novolac can be modified with a butadiene-acrylonitrile toughener, for example, with a carboxyl-terminated butadiene acrylonitrile (CTBN). The CTBN modified epoxy functional phenol-formaldehyde novolac can be present in the thermosetting composition in an amount of 4 to 10 vol %, or 5 to 7.5 vol %, or 6 to 7 vol % based on the total volume of the thermosetting composition minus any reinforcing fabric. The thermoset epoxy resin can comprise residues of a 9,10-dihydro-9-oxa-10-phosphaphenanthrene-10-oxide (DOPO) functional bisphenol A Phenol-Formaldehyde novolac. The DOPO modified epoxy functional bisphenol A Phenol-Formaldehyde novolac can be present in the thermosetting composition in an amount of 10 to 20 vol %, or 13 to 16 vol %, or 14 to 16 vol % based on the total volume of the thermosetting composition minus any reinforcing fabric. The thermosetting composition can comprise one or more of these multi-part epoxy systems.

The thermosetting composition can comprise at least one of a curing agent such as an acid anhydride curing agent, an amine curing agent, a blocked isocyanate curing agent, an isocyanate curing agent, a phenolic curing agent, a polyaminoamide curing agent, or a polymercaptan curing agent. The curing agent can comprise a phenolic curing agent. The curing agent can comprise a phosphorus-containing phenolic curing agent. The curing agent can be latent and comprise cyanoguanidine.

The equivalent number of the functional group of the curing agent with respect to 1 equivalent of the epoxy group of the epoxy monomer can be 0.005 to 5 equivalents, or 0.01 to 3 equivalents, or 0.5 to 1.5 equivalents. For example, when a phenolic curing agent is used as a curing agent, the chemical equivalent represents the equivalent number of hydroxyl groups of the phenol curing agent to 1 equivalent of the epoxy group, and when an amine curing agent is used as a curing agent, the chemical equivalent represents the equivalent number of active hydrogens of the amine curing agent to 1 equivalent of the epoxy group.

A catalyst can be present in the thermosetting composition to catalyze the thermosetting reaction. The catalyst is not particularly limited and can comprise any typical catalyst for curing epoxy resins. As an example, the catalyst can comprise at least one of benzyldimethylamide, benzyltrimethylammonium chloride, zinc(II)acetylacetonate, zinc(II)lactate, or aluminum(III)acetylacetonate. The catalyst can be present in the thermosetting composition in an amount of 0.05 to 0.5 wt %, or 0.1 to 0.4 wt % based on the based on the total weight of the thermosetting composition minus any reinforcing fabric. The thermosetting composition can be free of a solvent and the amounts based on the thermosetting composition can be based on amounts minus any solvent if present.

The thermosetting composition can comprise an accelerator to regulate thermal sensitivity during b-staging and result in a higher glass transition temperature and a more thorough cure. The accelerator can comprise at least one of an imidazole compound, a phosphine compound, or a borate salt compound. The accelerator can comprise an imidazole compound, for example, at least one of 2-methyl imidazole or 2-phenyl imidazole. Using a more sterically bulky less reactive accelerator, such as or 2-phenyl imidazole can permit the addition thereof of an amount necessary to maximize glass transition temperature (Tg) of the resulting composite upon thermal cure while maintaining an acceptable level of resin flow as requisite b-staging conditions are applied. The accelerator can be present in the composite in an amount of 0.001 to 1 wt %, or 0.005 to 0.5 wt % based on the total weight of the composite minus any reinforcing fabric.

The dielectric composite comprises a hexagonal boron nitride. The hexagonal boron nitride can be present in an amount of 10 to 55 vol %, or 30 to 55 vol %, or 40 to 50 vol % based on the total volume of the dielectric composite minus any reinforcing fabric. The hexagonal boron nitride comprises a plurality of hexagonal boron nitride platelets and a plurality of hexagonal boron nitride agglomerates. A volume ratio of the hexagonal boron nitride agglomerates to the hexagonal boron nitride platelets can be 1:1.5 to 4:1; or 1:1 to 3.5:1; or 1.5:1 to 3.5:1, or 2.5:1 to 3.5:1.

The hexagonal boron nitride platelets can have a $D_{10}$ particle size by volume of less than or equal to 6, or 1 to 5 micrometers. The hexagonal boron nitride platelets can have a $D_{50}$ particle size by volume of 7 to 18 micrometers, or 8 to 15 micrometers. The hexagonal boron nitride platelets can have a $D_{90}$ particle size by volume of greater than or equal to 20 micrometers, or 25 to 35 micrometers. When referring the particle size of the boron nitride platelets, the particle size refers the average diameter of the broad surface of the respective platelets. The hexagonal boron nitride platelets can have a specific surface area of 3 to 5 meters squared per gram (m²/g).

The hexagonal boron nitride agglomerates can have a $D_{10}$ particle size by volume of 20 to 50 micrometers. The hexagonal boron nitride agglomerates can have a $D_{50}$ particle size by volume of 50 to 80 micrometers. The hexagonal boron nitride agglomerates can have a $D_{90}$ particle size by volume of 90 to 140 micrometers, or 80 to 120 micrometers. When referring the particle size of the boron nitride agglomerates, the particle size refers the average diameter of the respective agglomerates. The hexagonal boron nitride agglomerates can have a specific surface area of 1.6 to 3.8 meters squared per gram (m²/g).

When referring to particle size, it is known that $D_x$, refers to x % of the particles having a particle size less than or equal to the number. For example, a $D_{10}$ particle size by volume of 5, means that 10 volume percent of the particles have a diameter of less than or equal to 5 micrometers and 90 volume percent of the particles have a diameter greater than 5 micrometers. Also, as used herein, the particle size can be determined by Dynamic Light Scattering (DLS). Brownian motion of particles in suspension causes incident laser light to be scattered at different intensities. Analysis of these intensity fluctuations yields the velocity of the Brownian motion and hence particle size using the Stokes-Einstein relationship. Dynamic Light Scattering Systems manufactured by Microtrac is an exemplary example of the equipment used herein to measure particle size.

The dielectric composite can comprise a dielectric filler. The dielectric filler can comprise at least one of a fused silica or an alumina. The dielectric composite can comprise 3 to 7.5 vol % of the dielectric filler, for example, of the fused silica based on the total volume of the composite minus any reinforcing fabric. The fused silica can be spherical, having an average particle diameter of 5 to 10 micrometers, or 6 to 9 micrometers.

The dielectric composite can comprise an epoxy silane, for example, at least one of 3-glycidoxypropyldimethylethoxysilane, 3-glycidoxypropylmethyldiethoxysilane, 3-glycidoxypropylmethyldimethoxysilane, 3-glycidoxypropyltriethoxysilane, 3-glycidoxypropyltrimethoxysilane, epoxycyclohexylethyltriethoxysilane, epoxycyclohexylethyltrimethoxysilane, or epoxyhexyltriethoxysilane. The dielectric composite can comprise 0.1 to 2 wt %, or 0.5 to 1.5 wt % of the epoxy silane based on the total weight of the dielectric composite minus any reinforcing fabric.

The dielectric composite can comprise a de-aerator. The de-aerator can comprise alkyl polyacrylates such as those derived from methyl acrylate, ethyl acrylate, n-butyl acrylate, n-amyl acrylate, isobornyl acrylate, isobutyl acrylate, tert-butyl acrylate, hexyl acrylate, 2-ethylhexylacrylate, 2-methoxyethyl acrylate, 2-phenoxy acrylate, octyl acrylate, isodecyl acrylate, decyl acrylate, lauryl acrylate, tridecyl acrylate, and octadecyl acrylate. The de-aerator can also comprise co-polymers of polyethylene and polypropylene oxide (EO/PO). The dielectric composite can comprise 0.1 to 1 wt %, or 0.3 to 0.8 wt % of the de-aerator based on the total weight of the dielectric composite minus any reinforcing fabric.

The dielectric composite can comprise a flame retardant, for example, a halogen-free flame retardant. The flame retardant can comprise a metal hydrate, for example, at least one of aluminum hydroxide, magnesium hydroxide, calcium hydroxide, iron hydroxide, zinc hydroxide, copper hydroxide, nickel hydroxide, or hydrates of calcium aluminate, gypsum dihydrate, zinc borate, or barium metaborate. The flame retardant can comprise an organic flame retardant, for example, at least one of melamine cyanurate, fine particle size melamine polyphosphate, various other phosphorus-containing compounds such as phosphinates, diphosphinates, phosphonates, phosphates, polysilsesquioxanes, siloxanes, or halogenated compounds (such as hexachloroendomethylenetetrahydrophthalic acid (HET acid), tetrabromophthalic acid, or dibromoneopentyl glycol).

The dielectric composite comprises a reinforcing layer. The reinforcing layer comprising a plurality of fibers that can help control shrinkage within the plane of the dielectric composite during cure and can provide an increased dimensional stability and mechanical strength relative to the same dielectric composite without the reinforcing layer. The reinforcing layer can be a woven layer or a non-woven layer. The fibers can comprise at least one of glass fibers (such as E glass fibers, S glass fibers, and D glass fibers), silica fibers, polymeric fibers (such as polyetherimide fibers, polysulfone fibers, poly(ether ketone) fibers, polyester fibers, polyethersulfone fibers, polycarbonate fibers, aromatic polyamide fibers, or liquid crystal polymer fibers such as VECTRAN commercially available from Kuraray)). The fibers can have a diameter of 10 nanometers to 10 micrometers. The reinforcing layer can have a thickness of less than or equal to 200 micrometers, or 50 to 150 micrometers. The dielectric composite can comprise 5 to 15 volume percent, or 6 to 10 volume percent, or 7 to 11 volume percent, or 7 to 9 volume percent of the reinforcing layer based on the total volume of the dielectric composite.

The dielectric composite can comprise a thermoset epoxy resin; a reinforcing layer; greater than or equal 40 volume percent of a hexagonal boron nitride based on the total volume of the dielectric composite minus the reinforcing layer; 3 to 7.5 volume percent of a fused silica based on the total volume of the dielectric composite minus the reinforcing layer; an epoxy silane; an accelerator; and a de-aerator. The dielectric composite can comprise 5 to 20 weight percent of a glass reinforcing layer based on the total weight of the dielectric composite. The dielectric composite can comprise 40 to 50 volume percent of the thermoset epoxy resin based on the total volume of the dielectric composite minus the glass reinforcing fabric. The thermoset epoxy resin can comprise an epoxy functional phenol-formaldehyde novolac and a 9,10-dihydro-9-oxa-10-phospha-phenanthrene-10-oxide (DOPO) functional bisphenol A Phenol-Formaldehyde novolac. The fused silica can have an average particle size of 5 to 10 micrometers. The dielectric composite can comprise 0.5 to 2 weight percent of the epoxy silane based on the total weight of the dielectric composite minus the glass reinforcing fabric. The dielectric composite can comprise 0.001 to 1, or 0.005 to 0.5 weight percent of an aryl-imidazole accelerator based on the total weight of the dielectric composite minus the glass reinforcing fabric. The dielectric composite can comprise 0.1 to 1, or 0.3 to 0.8 weight percent of the de-aerator based on the total weight of the dielectric composite minus the glass reinforcing fabric. The hexagonal boron nitride can comprise a plurality of hexagonal boron nitride platelets and a plurality of hexagonal boron nitride agglomerates. A volume ratio of the hexagonal boron nitride agglomerates to the hexagonal boron nitride platelets can be 1:1.5 to 4:1; or 1:1 to 3.5:1; or 1.5:1 to 3.5:1, or 2.5:1 to 3.5:1. The plurality of hexagonal boron nitride platelets can have a $D_{10}$ particle size by volume of less than or equal to 6 micrometers, a $D_{50}$ particle size by volume of 7 to 18 micrometers, and a $D_{90}$ particle size by volume of greater than or equal to 20 micrometers. The plurality of hexagonal boron nitride agglomerates can have a $D_{10}$ particle size by volume of 20 to 50 micrometers, a $D_{50}$ particle size by volume of 50 to 80 micrometers, and a $D_{90}$ particle size by volume of 90 to 140 micrometers.

The dielectric composite can have a peel strength to copper of greater than or equal to 0.7 kg/cm, or 0.7 to 1 kg/cm measured in accordance with IPC test method 650, 2.4.8 for at least one of the copper-clad laminate as-received (AR) or after applying a thermal stress (AS) by heating laminate test specimens to a temperature of 288° C. for 10 seconds.

The dielectric composite can have a thermal conductivity in the z-axis of greater than or equal to 1.8 W/mK, or 1.8 to 2.5 W/mK as measured in accordance with ASTM E1461-13 or ASTM D5470-12.

The dielectric composite can have a resin flow of 12.5 to 25.5 mm, or 13 to 18 mm as determined by measuring the overflow of partially cured resin which has been b-staged for 3 minutes at 145° C. and pressed at a pressure of 1.4 megapascals (MPa) and a temperature of 171° C.

The dielectric composite can have a first pass glass transition temperature of 150 to 165° C., or 160 to 165° C. determined in accordance with the "Glass Transition Temperature and Cure Factor by DSC" method (IPC TM 650 2.4.25) using differential scanning calorimetry (DSC).

The dielectric composite can be prepared by impregnating a reinforcing layer with a thermosetting composition comprising an epoxy monomer, a curing agent, the hexagonal boron nitride, the fused silica, the epoxy silane, the accelerator, and the de-aerator. The impregnating can comprise casting the thermosetting composition onto the reinforcing layer or dip-coating the reinforcing layer into the thermosetting composition, or roll-coating the thermosetting composition onto the reinforcing layer. The impregnated layer can then be at least partially cured to form a prepreg. The partial curing can comprise b-staging in an oven at a given temperature for a certain length of time. The reinforcing layer with the partially cured thermoset located thereon can form a prepreg or dielectric layer having a thickness of 1 to 1,000 micrometers.

A laminate can be formed by forming a multilayer stack comprising one or more of the dielectric prepreg layers and optionally one or more electrically conductive layers; and laminating the multilayer stack. Adhesion or bond-ply prepreg layers can optionally and subsequently be present in a multilayer stack of laminates to promote adhesion between the respective laminate layers. The multilayer stack comprising laminates and prepreg bond-plies can be placed in a press, for example, a vacuum press, under a pressure and temperature for a duration of time suitable to bond the layers together. Alternatively, the laminate can be free of an electrically conductive layer, such as a copper foil.

Useful electrically conductive layers include, for example, stainless steel, copper, nickel, gold, silver, aluminum, zinc, tin, lead, transition metals, or alloys comprising at least two of the foregoing. There are no particular limitations regarding the thickness of the electrically conductive layer, nor are there any limitations as to the shape, size, or texture of the surface of the electrically conductive layer. The electrically conductive layer can have a thickness of 3 to 200 micrometers, or 9 to 180 micrometers. When two or more electrically conductive layers are present, the thickness of the two layers can be the same or different. The electrically conductive layer can comprise a copper layer. Suitable electrically conductive layers include a thin layer of an electrically conductive metal such as a copper foil presently used in the formation of circuits, for example, electrodeposited copper foils. The copper foil can have a root mean squared (RMS) roughness of less than or equal to 2 micrometers, or less than or equal to 0.7 micrometers, where roughness is measured using a stylus profilometer.

The electrically conductive layer can be applied by laminating the electrically conductive layer and the dielectric layer, by direct laser structuring, or by adhering the electrically conductive layer to the substrate via an adhesive layer. Other methods known in the art can be used to apply the electrically conductive layer where permitted by the particular materials and form of the circuit material, for example, electrodeposition, chemical vapor deposition, and the like.

The laminating can entail laminating a multilayer stack comprising the dielectric layer (for example that is partially cured), an electrically conductive layer, and an optional intermediate layer between the dielectric layer and the electrically conductive layer to form a layered structure. The electrically conductive layer can be in direct contact with the dielectric layer, without the intermediate layer. The layered structure can then be placed in a press, e.g., a vacuum press, under a pressure and temperature for a duration of time suitable to bond the layers and form a laminate. Lamination and optional curing can be by a one-step process, for example, using a vacuum press, or can be by a multi-step process.

The laminating, for example, to obtain a partial cure or to obtain the final cure can occur at least one of a laminating pressure of 1 to 8 megapascal, or 1 to 3 megapascal, a laminating temperature of 100 to 180° C., or a soak time, for example, 20 minutes, or 60 to 120 minutes and thereafter cooled (while still under pressure) to less than or equal to 150° C.

If present, the intermediate layer can comprise a polyfluorocarbon film that can be located in between the electrically conductive layer and the dielectric layer, and an optional layer of microglass reinforced fluorocarbon polymer can be located in between the polyfluorocarbon film and the electrically conductive layer. The layer of microglass reinforced fluorocarbon polymer can increase the adhesion of the electrically conductive layer to the dielectric layer. The microglass can be present in an amount of 4 to 30 weight percent (wt %) based on the total weight of the layer. The microglass can have a longest length scale of less than or equal to 900 micrometers, or less than or equal to 500 micrometers. The microglass can be microglass of the type as commercially available by Johns-Manville Corporation of Denver, Colorado. The polyfluorocarbon film comprises a fluoropolymer (such as polytetrafluoroethylene, a fluorinated ethylene-propylene copolymer, and a copolymer having a tetrafluoroethylene backbone with a fully fluorinated alkoxy side chain).

The electrically conductive layer can be applied by adhesively applying the conductive layer. The electrically conductive layer can be a circuit (the metallized layer of another circuit), for example, a flex circuit. An adhesion layer can be disposed between one or more electrically conductive layers and the dielectric layer.

The dielectric composite can be used in a variety of circuit materials. As used herein, a circuit material is an article used in the manufacture of circuits and multilayer circuits, and includes, for example, circuit subassemblies, bond plies, resin-coated electrically conductive layers, unclad dielectric layers, free films, and cover films. Circuit subassemblies include circuit laminates having an electrically conductive layer, e.g., copper, fixedly attached to a dielectric layer. Double clad circuit laminates have two electrically conductive layers, one on each side of the dielectric layer. Patterning an electrically conductive layer of a laminate, for example, by etching, provides a circuit. Multilayer circuits comprise a plurality of electrically conductive layers, at least one of which can contain an electrically conductive wiring pattern. Typically, multilayer circuits are formed by laminating one or more circuits together using bond plies, by building up additional layers with resin coated electrically conductive layers that are subsequently etched, or by building up additional layers by adding unclad dielectric layers followed by additive metallization. After forming the multilayer circuit, known hole-forming and plating technologies can be used to produce useful electrical pathways between electrically conductive layers.

The dielectric composite can be used in an antenna. The antenna can be used in a mobile phone (such as a smartphone), a tablet, a laptop, or the like.

The dielectric composite can be used in power metal-oxide-semiconductor field-effect transistors (MOSFETs), rectifiers, inverters, and high-brightness light-emitting-diodes (LEDs). Exemplifying design requirements are; reduced reliance on metal-heat-sinks and convective cooling for thermal management; lower board and component operating temperatures; lower external case and housing temperatures; increased power throughput by lowering component junction temperatures and higher temperature operating environments.

The following examples are provided to illustrate the present disclosure. The examples are merely illustrative and are not intended to limit devices made in accordance with the disclosure to the materials, conditions, or process parameters set forth therein.

EXAMPLES

In the examples, the following test methods and procedures were used.

The resin content by weight (% RC) was determined in accordance with the "Treated Weight of Prepreg" test method (IPC TM 650 2.3.16.2).

Standard resin flow was determined in accordance with the "Resin Flow Percent of Prepreg" test method (IPC-TM-650 2.3.17 Revision D) by pressing a four ply stack of 4 inches (10.16 centimeters) by 4 inches (10.16 centimeters) plies of prepreg at a pressure of 3,200 pounds force (14 kilonewtons) and a temperature of 171° C. and determining the weight change of the composite.

The disc resin flow was determined by cutting a disc, 3.192 inches in diameter (8 square inches) of the b-staged prepreg and pressing a four ply stack of the discs at a pressure of either 1,600 or 3,200 pounds force (7 or 14 kilonewtons) and a temperature of 171° C. and measuring the flow of the resin in distance around the edge of the stacked discs.

As indicated, the glass transition temperature (Tg) was determined in accordance with the "Glass Transition Temperature and Thermal Expansion of Materials Used in High Density Interconnection (HDI) and Microvias—TMA Method" (IPC-TM-650 2.4.24.5 Revision D) using thermal mechanical analysis (TMA) or in accordance with the "Glass Transition Temperature and Cure Factor by DSC" method (IPC TM 650 2.4.25) using differential scanning calorimetry (DSC).

Copper peel strength was tested in accordance with the "Peel strength of metallic clad laminates" test method (IPC-TM-650 2.4.8 Revision C) using a ½ ounce (14.2 gram) copper foil and testing copper-clad laminate as-received (AR) and after thermal stress (AS). In the examples, a "1 ounce copper foil" refers to the thickness of the copper layer achieved when 1 ounce (29.6 milliliters) of copper is pressed flat and spread evenly over a one square foot (929 square centimeters) area. The equivalent thickness is 1.37 mils (0.0347 millimeters). A ½ ounce copper foil correspondingly has a thickness of 0.01735 millimeters. As indicated, the copper clad laminates were tested for peel strength as-received (AR) or after being subjected to a thermal stress (AS) by heating to a temperature of 288° C. for 10 seconds.

The thermal conductivity in-plane (x- and y-directions) and out of plane (z-direction) was determined in accordance with the "Standard Test Method for Thermal Diffusivity by the Flash Method" (ASTM E1461-13) using transient thermal impedance or in accordance with the "Standard Test Method for Thermal Transmission Properties of Thermally Conductive Electrical Insulation Materials" (ASTM D5470-12) using steady state thermal impedance.

The components used in the examples are shown in Table 1.

TABLE 1

| | | |
|---|---|---|
| Ph-F Novolac | Phenol-Formaldehyde Novolac, Epoxy Functional, XZ92740 | Olin ™ Corporation |
| BPA-F Novolac | Bisphenol A Phenol-Formaldehyde Novolac, DOPO Functional, XZ92741 | Olin ™ Corporation |
| Ph-F Novolac CTBN | Phenol-Formaldehyde Novolac, Epoxy Functional, CTBN, HYPOX ™ RF928 | Huntsman Advanced Materials |
| Cyanate ester | Cyanate Ester Resin, PRIMASET ™ BA-3000S | Lonza |
| PPE | PPE Resin, NORYL ™ SA90-100 | SABIC |
| Flame Retardant-1 | Halogen Free Flame Retardant, RABITLE ™ FP-110 | Fushimi - Chori America |
| Flame Retardant-2 | Halogen Free Flame Retardant, EXOLIT ™ OP-930 | Clariant |
| h-BN Agglom-1 | High Density Agglomerates of Hexagonal Boron Nitride, CARBOTHERM ™ PCTH$_3$MHF, having a $D_{10}$ particle size of 35 micrometers, a $D_{50}$ particle size of 75, and a $D_{90}$ particle size of 120 micrometers and a specific surface area of 2 $m^2/g$. | Saint-Gobain |
| h-BN Agglom-2 | Agglomerate Hexagonal Boron Nitride, Cooling Filler Agglomerates 250S, having a $D_{10}$ particle size of 8-20 micrometers, a $D_{50}$ particle size of 40-100, and a $D_{90}$ particle size of 120-210 micrometers and a specific surface area of less than 5 $m^2/g$. | 3M ™ |
| h-BN Spheres | Spherical Agglomerates of Hexagonal Boron Nitride, POLARTHERM ™ PTX25, having a $D_{10}$ particle size of 10 micrometers, a $D_{50}$ particle size of 25, and a $D_{90}$ particle size of 45 micrometers and a specific surface area of 7 $m^2/g$. | Momentive ™ |
| h-BN Platelets | Single Crystal Platelets of Hexagonal Boron Nitride COOLFLOW ™ CF100, having a $D_{10}$ particle size of 5 micrometers, a $D_{50}$ particle size of 8-15, and a $D_{90}$ particle size of 25 micrometers and a specific surface area of 3-5 $m^2/g$. | Momentive ™ |
| h-BN Flakes | Platelet Hexagonal Boron Nitride, Cooling Filler Platelets CFF500-3, having a $D_{10}$ particle size of 140-260 micrometers and a $D_{50}$ particle size of 300-530 micrometers and a specific surface area of 1 $m^2/g$. | 3M ™ |
| Fused Silica | Spherical Fused Silica, FB-8S, average diameter of 8 micrometers | Denka |
| α-Alumina | Spherical α-Alumina, DAW-10 | Denka |
| Me-Accelerator | Accelerator, 2-methyl imidazole (2-MI) | Air Products |
| Ph-Accelerator | Accelerator, 2-phenyl imidazole (2-PI) | Air Products |
| Catalyst | Trimerization Catalyst, aluminum acetylacetonate, AlAcAc | Pfaltz & Bauer |
| Curing agent | Latent Curative, (Cyanoguanidine) (DICY) | Air Products |
| Epoxy Silane | Silane Coupling Agent, SILQUEST ™ A-187 Silane | Momentive ™ |
| De-aerator | De-aerator, Proprietary, Contains Petroleum Distillates, EFKA ™ PB 2720 | BASF |
| Glass fabric 1 | Plain Weave Woven Glass (Warp = 60, Fill = 52), Style 104 | JPS Composite Materials |
| Glass fabric 2 | Plain Weave Spread Woven Glass (Warp = 75, Fill = 75), Style 1027S | Shanghai Grace Fabric |
| Copper foil | Matte-Side Treated Copper Foil, TWS | Circuit Foil Luxembourg | minus the glass fabric and w/w % is the weight of the component based on the total weight of the composite minus the glass fabric.

Example 1 evaluated 30 volume percent h-BN agglomerates-2 and h-BN flakes in equal parts. The resulting prepregs exhibited ample resin flow but their appearance was unacceptable due to excessively large h-BN flakes. Composite Tg and copper peel strength were acceptable but thermal conductivity was low at only 1 W/mK.

Relative to Example 1, Examples 2 and 3 evaluated increased volume loadings of smaller particle sized h-BN agglomerates-1 and h-BN platelets in order to increase thermal conductivity and address prepreg appearance. Prepreg resin flow decreased as overall h-BN volume loading increased. In order to achieve acceptable prepreg resin flow, the methyl-accelerator level was reduced in these composites. Composite thermal conductivity was acceptable, but copper peel strengths were low. Composite Tg was directly related to the methyl-accelerator level.

Examples 1-12: Composites Comprising Varying Amounts and Types of Components

Thermosetting compositions were prepared for use in forming the prepregs of woven glass reinforced composites as described in Table 2. The prepregs were formed by treating a glass fabric as indicated in Table 2 with the respective thermosetting compositions to form coated glass fabric samples. The coated glass fabric samples were dried in a vertical oven and then partial cured according to the b-staging time and temperatures indicated in Table 2 to form the prepregs. The respective samples were then tested to determine their respective properties, which are also shown in Table 2. In the table, the v/v % is the volume of the component based on the total volume of the composite Examples 4-9 evaluated 44 or 45 volume percent h-BN agglomerates-1 and h-BN platelets in a 3-to-1 ratio to maximize thermal conductivity and achieve other critical properties. Ph-F Novolac CTBN and a sterically hindered phenyl-imidazole enhanced prepreg resin flow, without adversely affecting composite Tg. The addition of fused silica and an epoxy silane enhanced copper peel strength. Prepreg resin flow was inversely related to the fused silica level.

Without intending to be bound by theory, it is believed that the fused silica and epoxy silane strengthened the resin-solids matrix thereby increasing copper peel strength.

Examples 10-12 evaluated 44.0, 44.5, 45.0 volume percent h-BN agglomerates-1 and h-BN platelets in a 3-to-1 ratio combined with fused silica and an epoxy silane. Thermal conductivity was measured using the "Standard Test Method for Thermal Transmission Properties of Thermally Conductive Electrical Insulation Materials" (ASTM D5470-12). Composite thermal conductivity was acceptable when the overall h-BN volume was greater than or equal to 44.5%. Prepreg resin flow and appearance were acceptable. Composite Tg and copper peel strengths were acceptable.

TABLE 2

| Example | 1 | 2 | 3 | 4 | 5 | 6 |
|---|---|---|---|---|---|---|
| Ph-F Novolac (v/v %) | 43.9 | 28.7 | 27.1 | 28.5 | 28.2 | 29.7 |
| BPA-F Novolac (v/v %) | 25.8 | 16.9 | 15.9 | 16.7 | 16.6 | 17.4 |
| Ph-F Novolac CTBN (v/v %) | — | — | — | — | — | 6.5 |
| h-BN Agglom-1 (v/v %) | — | 22.5 | 23.7 | 33.7 | 33.7 | 33.8 |
| h-BN Platelets (v/v %) | — | 22.5 | 23.7 | 11.2 | 11.2 | 11.3 |
| h-BN Agglom-2 (v/v %) | 15.0 | — | — | — | — | — |
| h-BN Flakes (v/v %) | 15.0 | — | — | — | — | — |
| Fused Silica (v/v %) | — | 7.3 | 6.9 | 7.3 | 7.2 | — |
| Me-Accelerator (w/w %) | 0.250 | 0.179 | 0.238 | 0.250 | — | — |
| Ph-Accelerator (w/w %) | — | — | — | — | 0.250 | 0.250 |
| Curing agent (w/w %) | — | — | — | — | 0.250 | 0.250 |
| Epoxy Silane (w/w %) | — | 0.8 | 1.0 | 1.0 | 1.0 | — |
| De-aerator (w/w %) | — | 0.4 | 0.4 | 0.5 | 0.5 | 0.5 |
| Composition Details | | | | | | |
| Volume ratio of Agglom:Platelets | 1:1 | 1:1 | 1:1 | 3:1 | 3:1 | 3:1 |
| Total Amount of h-BN (v/v %) | 30.0 | 45.0 | 47.5 | 45.0 | 45.0 | 45.0 |
| Total Amount of Ceramics (v/v %) | 30.0 | 52.3 | 54.4 | 52.2 | 52.2 | 45.0 |
| Glass fabric | 1 | 1 | 1 | 2 | 2 | 2 |
| Resin content by weight (%) | 89.1 | 90.7 | 90.1 | 89.3 | 89.6 | 89.8 |
| Properties | | | | | | |
| b-Staging (min, ° C.) | 7.0, 176 | 3.0, 136 | 3.0, 141 | 3.0, 145 | 3.0, 140 | 5.5, 155 |
| Standard Resin Flow (%) | 24 | — | — | — | — | — |
| Disc Resin Flow, 1600 lbf (mm) | — | 20.2 | 16.2 | — | 6.5 | 31.3 |
| Disc Resin Flow, 3200 lbf (mm) | — | — | — | 11.4 | — | — |
| Tg by DSC, 1st and 2nd Pass (° C.) | 160, 162 | 149, 154 | 160, 163 | 160, 172 | 163, 163 | 162, 163 |
| Peel strength, Cu foil AR (kg/cm) | 0.89 | 0.61 | 0.54 | 0.75 | 0.77 | 0.61 |
| Peel strength, Cu foil AS, (kg/cm) | 0.93 | 0.61 | 0.47 | 0.79 | 0.77 | 0.66 |
| Thermal conductivity (z-Axis, E1461) (W/mK) | 1.0 | 2.6 | 2.5 | 2.1 | 1.6 | 1.7 |
| Thermal conductivity (z-Axis, D5470) (W/mK) | — | — | — | — | — | — |

| Example | 7 | 8 | 9 | 10 | 11 | 12 |
|---|---|---|---|---|---|---|
| Ph-F Novolac (v/v %) | 24.9 | 26.1 | 25.5 | 26.1 | 25.8 | 26.1 |
| BPA-F Novolac (v/v %) | 14.6 | 15.3 | 15.0 | 15.3 | 15.1 | 15.4 |
| Ph-F Novolac CTBN (v/v %) | 6.6 | 6.6 | 6.6 | 6.6 | 6.6 | 6.6 |
| h-BN Agglom-1 (v/v %) | 33.0 | 33.0 | 33.8 | 33.0 | 33.4 | 33.8 |
| h-BN Platelets (v/v %) | 11.0 | 11.0 | 11.3 | 11.0 | 11.1 | 11.3 |
| h-BN Agglom-2 (v/v %) | — | — | — | — | — | — |
| h-BN Flakes (v/v %) | — | — | — | — | — | — |
| Fused Silica (v/v %) | 7.0 | 5.0 | 5.0 | 5.0 | 5.0 | 4.0 |
| Me-Accelerator (w/w %) | — | — | — | — | — | — |
| Ph-Accelerator (w/w %) | 0.250 | 0.250 | 0.250 | 0.250 | 0.250 | 0.250 |
| Curing agent (w/w %) | 0.250 | 0.250 | 0.250 | 0.250 | 0.250 | 0.250 |
| Epoxy Silane (w/w %) | 1.0 | 1.0 | 1.0 | 1.0 | 1.0 | 1.0 |
| De-aerator (w/w %) | 0.5 | 0.5 | 0.5 | 0.5 | 0.5 | 0.5 |
| Composition Details | | | | | | |
| Volume ratio of Agglom:Platelets | 3:1 | 3:1 | 3:1 | 3:1 | 3:1 | 3:1 |
| Total Amount of h-BN (v/v %) | 44.0 | 44.0 | 45.0 | 44.0 | 44.5 | 45.0 |
| Total Amount of Ceramics (v/v %) | 51.0 | 49.0 | 50.0 | 49.0 | 49.5 | 49.0 |
| Glass fabric | 2 | 2 | 2 | 2 | 2 | 2 |
| Resin content by weight (%) | 89.8 | 89.4 | 90.3 | 89.4 | 89.5 | 89.3 |
| Properties | | | | | | |
| b-Staging (min, ° C.) | 3.0, 145 | 3.0, 145 | 3.0, 145 | 3.0, 145 | 3.0, 145 | 3.0, 145 |
| Standard Resin Flow (%) | — | — | — | — | — | — |
| Disc Resin Flow, 1600 lbf (mm) | 13.5 | 16.8 | 17.2 | 16.8 | 13.3 | 13.1 |
| Disc Resin Flow, 3200 lbf (mm) | — | — | — | — | — | — |
| Tg by DSC, 1st and 2nd Pass (° C.) | 155, 163 | 161, 162 | 161, 163 | 161, 162 | 163, 163 | 161, 164 |
| Peel strength, Cu foil AR (kg/cm) | 0.77 | 0.73 | 0.73 | 0.73 | 0.72 | 0.68 |

TABLE 2-continued

| | | | | | | |
|---|---|---|---|---|---|---|
| Peel strength, Cu foil AS, (kg/cm) | 0.82 | 0.88 | 0.75 | 0.72 | 0.64 | 0.75 |
| Thermal conductivity (z-Axis, E1461) (W/mK) | 2.0 | 2.0 | 1.8 | — | — | — |
| Thermal conductivity (z-Axis, D5470) (W/mK) | — | — | — | 1.8 | 2.2 | 2.4 |

Examples 13-15: Composites Comprising Varying Amounts and Types of Components Thermosetting compositions were prepared for use in forming the prepregs of woven glass reinforced composites as described in Table 3. The prepregs were formed by treating a glass fabric as indicated in Table 3 with the respective thermosetting compositions to form coated glass fabric samples. The coated glass fabric samples were dried in a vertical oven and then partial cured according to the b-staging time and temperatures indicated in Table 3 to form the prepregs. The respective samples were then tested to determine their respective properties, which are also shown in Table 3. In the table, the v/v % is the volume of the component based on the total volume of the composite minus the glass fabric and w/w % is the weight of the component based on the total weight of the composite minus the glass fabric.

Example 13 evaluated exclusively h-BN platelets at about 30 volume percent and a thermosetting resin system derived from a cyanate ester resin and a PPE resin. Prepreg resin flow and appearance were acceptable even as percent resin content was reduced to produce thinner plies. Composite thermal conductivity and copper peel strength were low.

Example 14 primarily focused on α-Alumina as a means of enhancing thermal conductivity. Prepreg resin flow and appearance were acceptable. Composite thermal conductivity was low. Composite Tg and copper peel strengths were acceptable. Since α-Alumina is more abrasive than h-BN, the resulting composite was harder to drill through.

Without intending to be bound by theory, it is believed that α-Alumina is not as effective as h-BN for increasing composite thermal conductivity.

Example 15 evaluated 45 volume percent h-BN agglomerates-1 and h-BN platelets in a 3-to-1 ratio without added fused silica and epoxy silane. Prepreg resin flow and appearance were acceptable. Composite thermal conductivity and Tg were acceptable. Composite copper peel strengths were low.

TABLE 3

| Example | 13 | 14 | 15 |
|---|---|---|---|
| Ph-f Novolac (v/v %) | — | 30.6 | 29.7 |
| BPA-F Novolac (v/v %) | — | 18.0 | 17.4 |
| Ph-F Novolac CTBN (v/v %) | — | 2.4 | 6.5 |
| Cyanate ester (v/v %) | 36.4 | — | — |
| PPE (v/v %) | 15.6 | — | — |
| Flame Retardant-1 (v/v %) | 14.3 | — | — |
| Flame Retardant-2 (v/v %) | 4.0 | — | — |
| h-BN Agglom-1 (v/v %) | — | — | 33.8 |
| h-BN Platelets (v/v %) | 28.1 | 7.4 | 11.3 |
| h-BN Spheres (v/v %) | — | 5.7 | — |
| α-Alumina (v/v %) | — | 33.1 | — |
| Me-Accelerator (w/w %) | 0.009 | 0.274 | — |
| Ph-Accelerator (w/w %) | — | — | 0.250 |
| Catalyst (w/w %) | 0.039 | — | — |
| Curative (w/w %) | — | 0.526 | 0.250 |
| Epoxy Silane (w/w %) | 0.6 | 0.3 | — |
| De-aerator (w/w %) | 0.6 | 0.4 | 0.5 |

TABLE 3-continued

| Example | 13 | 14 | 15 |
|---|---|---|---|
| Composition Details | | | |
| Volume ratio of Agglom:Platelets | 0:1 | 43:57 | 3:1 |
| Total Amount of h-BN (v/v %) | 28.1 | 13.2 | 45.0 |
| Total Amount of Ceramics (v/v %) | 28.1 | 46.3 | 45.0 |
| Glass fabric | 2 | 1 | 2 |
| Resin content by weight (%) | 77.5 | 88.0 | 89.3 |
| Properties | | | |
| b-Staging (min, ° C.) | 5.0, 161 | 5.0, 161 | 3.0, 145 |
| Standard Resin Flow (%) | 5-15 | — | — |
| Disc Resin Flow, 1600 lbf (mm) | — | 16.5 | 13.3 |
| Tg by DSC, 1st and 2nd Pass (° C.) | — | 163, 163 | 163, 163 |
| Tg by TMA, 1st and 2nd Pass (° C.) | 180 | — | — |
| Peel strength, Cu foil AR (kg/cm) | 0.57 | 0.89 | 0.61 |
| Peel strength, Cu foil AS, (kg/cm) | 0.59 | 0.86 | 0.66 |
| Thermal conductivity (z-Axis, E1461) (W/mK) | 0.9 | 1.7 | 2.3 |
| Thermal conductivity (z-Axis, D5470) (W/mK) | 0.9 | 1.5 | 2.0 |
| Thermal conductivity (x/y-Axis, D5470) (W/mK) | 0.9 | 1.6 | 6.2 |

Set forth below are non-limiting aspects of the present disclosure.

Aspect 1: A dielectric composite comprising: a thermoset epoxy resin; a reinforcing layer; greater than or equal 40 vol % of a hexagonal boron nitride based on the total volume of the dielectric composite minus the reinforcing layer; 3 to 7.5 vol % of a fused silica based on the total volume of the dielectric composite minus the reinforcing layer; an epoxy silane; an accelerator; and a de-aerator; wherein the hexagonal boron nitride comprising a plurality of hexagonal boron nitride platelets and a plurality of hexagonal boron nitride agglomerates; wherein a volume ratio of the hexagonal boron nitride agglomerates to the hexagonal boron nitride platelets can be 1:1.5 to 4:1; or 1:1 to 3.5:1; or 1.5:1 to 3.5:1, or 2.5:1 to 3.5:1; wherein the plurality of hexagonal boron nitride platelets has a $D_{10}$ particle size by volume of less than or equal to 6 micrometers, a $D_{50}$ particle size by volume of 7 to 18 micrometers, and a $D_{90}$ particle size by volume of greater than or equal to 20 micrometers; wherein the plurality of hexagonal boron nitride agglomerates has a $D_{10}$ particle size by volume of 20 to 50 micrometers, a $D_{50}$ particle size by volume of 50 to 80 micrometers, and a $D_{90}$ particle size by volume of 90 to 140 micrometers.

Aspect 2: The dielectric composite of Aspect 1, wherein the dielectric composite has at least one of a peel strength to copper of greater than or equal to 0.7 kilograms per centimeter measured in accordance with IPC test method 650, 2.4.8 for copper-clad laminate as-received (AR) or after applying a thermal stress (AS) by heating laminate test specimens to a temperature of 288° C. for 10 seconds; a thermal conductivity in the z-axis of greater than or equal to 1.8 w/mK as measured in accordance with ASTM E1461-13 or ASTM D5470-12; or a resin flow of 12.5 to 25.5 mm as determined by measuring the overflow of partially cured resin which has been b-staged for 3 minutes at 145° C. and pressed at a pressure of 1.4 megapascals and a temperature of 171° C.

Aspect 3: The dielectric composite of any of the preceding aspects, wherein the thermoset epoxy resin comprises a residue of at least one of an epoxy functional phenol-formaldehyde novolac; or a 9,10-dihydro-9-oxa-10-phosphaphenanthrene-10-oxide (DOPO) functional bisphenol A Phenol-Formaldehyde novolac.

Aspect 4: The dielectric composite of any of the preceding aspects, wherein the thermoset epoxy resin comprises a residue of a modified with a butadiene-acrylonitrile, for example, that is modified with a carboxyl-terminated butadiene acrylonitrile (CTBN).

Aspect 5: The dielectric composite of any of the preceding aspects, wherein the dielectric composite comprises 40 to 50 vol %, or 45 to 50 vol % of the thermoset epoxy resin based on the total volume of the dielectric composite minus the reinforcing fabric.

Aspect 6: The dielectric composite of any of the preceding aspects, wherein the fused silica can be spherical, having an average particle diameter of 5 to 10 micrometers.

Aspect 7: The dielectric composite of any of the preceding aspects, wherein the dielectric composite comprises 0.5 to 2 wt % of the epoxy silane based on the total weight of the dielectric composite minus the reinforcing fabric.

Aspect 8: The dielectric composite of any of the preceding aspects, wherein the dielectric composite comprises 0.001 to 1, or 0.005 to 0.5 wt % of the accelerator based on the total weight of the dielectric composite minus the reinforcing fabric.

Aspect 9: The dielectric composite of any of the preceding aspects, wherein the accelerator comprises at least one of an alkyl-imidazole or an aryl-imidazole; preferably 2-phenyl imidazole.

Aspect 10: The dielectric composite of any of the preceding aspects, wherein the dielectric composite comprises 0.1 to 1, or 0.3 to 0.8 wt % of the de-aerator based on the total weight of the dielectric composite minus the reinforcing fabric.

Aspect 11: The dielectric composite of any of the preceding aspects, wherein the dielectric composite comprises the reinforcing fabric in an amount of 5 to 20 wt %, or 8 to 15 wt % based on the total weight of the dielectric composite.

Aspect 12: The dielectric composite of any one or more of the preceding aspects, wherein the reinforcing plain-weave fabric comprises at least one of E glass fibers or L glass fibers or quartz fibers.

Aspect 13: The dielectric composite of any one or more of the preceding aspects, wherein the reinforcing spread-weave fabric comprises at least one of E glass fibers or L glass fibers or quartz fibers.

Aspect 14: The dielectric composite of any of the preceding aspects, further comprising at least one of a curing agent, an additional dielectric filler, or a halogen free flame retardant.

Aspect 15: The dielectric composite of any one or more of the preceding aspects, wherein the dielectric composite is a prepreg having a thickness of 1 to 1,000 micrometers; and wherein the thermoset is only partially cured.

Aspect 16: A multilayer article comprising: a dielectric layer comprising the dielectric composite of any of the preceding aspects; and at least one electrically conductive layer disposed on a surface of the dielectric layer.

Aspect 17: A dielectric composite, for example, of any one or more of the preceding aspects, comprising: 5 to 20 wt % of a glass reinforcing layer based on the total weight of the dielectric composite; 40 to 50 vol % of a thermoset epoxy resin based on the total volume of the dielectric composite minus the glass reinforcing fabric; wherein the thermoset epoxy resin comprises an epoxy functional phenol-formaldehyde novolac and a 9,10-dihydro-9-oxa-10-phosphaphenanthrene-10-oxide (DOPO) functional bisphenol A Phenol-Formaldehyde novolac; greater than or equal 40 vol % of a hexagonal boron nitride based on the total volume of the dielectric composite minus the reinforcing layer; 3 to 7.5 vol % of a fused silica based on the total volume of the dielectric composite minus the glass reinforcing layer; wherein the fused silica has an average particle size of 5 to 10 micrometers; 0.5 to 2 wt % of an epoxy silane based on the total weight of the dielectric composite minus the glass reinforcing fabric; 0.001 to 1, or 0.005 to 0.5 wt % of an aryl-imidazole accelerator based on the total weight of the dielectric composite minus the glass reinforcing fabric; and 0.1 to 1, or 0.3 to 0.8 wt % of a de-aerator based on the total weight of the dielectric composite minus the glass reinforcing fabric; wherein the hexagonal boron nitride comprising a plurality of hexagonal boron nitride platelets and a plurality of hexagonal boron nitride agglomerates; wherein a volume ratio of the hexagonal boron nitride agglomerates to the hexagonal boron nitride platelets can be 1:1.5 to 4:1; or 1:1 to 3.5:1; or 1.5:1 to 3.5:1, or 2.5:1 to 3.5:1; wherein the plurality of hexagonal boron nitride platelets has a $D_{10}$ particle size by volume of less than or equal to 6 micrometers, a $D_{50}$ particle size by volume of 7 to 18 micrometers, and a $D_{90}$ particle size by volume of greater than or equal to 20 micrometers; wherein the plurality of hexagonal boron nitride agglomerates has a $D_{10}$ particle size by volume of 20 to 50 micrometers, a $D_{50}$ particle size by volume of 50 to 80 micrometers, and a $D_{90}$ particle size by volume of 90 to 140 micrometers.

Aspect 18: A method of making a dielectric composite, for example, of any one or more of Aspects 1 to 17, comprising: forming a thermosetting composition comprising an epoxy monomer, a curing agent, the hexagonal boron nitride, the fused silica, the epoxy silane, the accelerator, and the de-aerator; coating the reinforcing fabric with the thermosetting composition; and at least partially curing the thermosetting composition to form the dielectric composite.

Aspect 19: The method of Aspect 18, further comprising laminating the dielectric composite with at least one electrically conductive layer.

Aspect 20: The method of Aspect 19, wherein the laminating occurs at a temperature of 100 to 180° C. or a pressure of 1 to 3 MPa for 60 to 120 minutes.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "at least one of" means that the list is inclusive of each element individually, as well as combinations of two or more elements of the list, and combinations of at least one element of the list with like elements not named. Also, the term "combination" is inclusive of blends, mixtures, alloys, reaction products, and the like.

The term "or" means "and/or" unless clearly indicated otherwise by context. Reference throughout the specification to "an aspect" means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

When an element such as a layer, film, region, or substrate is referred to as being "on" another element, it can be directly on the other element or intervening elements may also be present. In contrast, when an element is referred to as being "directly on" another element, there are no intervening elements present. For example, it is understood that the present electrically conductive layer can be on the dielectric layer with an intervening adhesive layer. Conversely, the electrically conductively layer can be directly on the dielectric layer with no intervening adhesive layer.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this disclosure belongs.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A dielectric composite comprising:
   a thermoset epoxy resin;
   a reinforcing layer;
   greater than or equal 40 volume percent of a hexagonal boron nitride based on the total volume of the dielectric composite minus the reinforcing layer;
   3 to 7.5 volume percent of a fused silica based on the total volume of the dielectric composite minus the reinforcing layer;
   an epoxy silane;
   an accelerator; and
   a de-aerator;
   wherein the hexagonal boron nitride comprising a plurality of hexagonal boron nitride platelets and a plurality of hexagonal boron nitride agglomerates; wherein a volume ratio of the hexagonal boron nitride agglomerates to the hexagonal boron nitride platelets is 1:1.5 to 4:1;
   wherein the plurality of hexagonal boron nitride platelets has a $D_{10}$ particle size by volume of less than or equal to 6 micrometers, a $D_{50}$ particle size by volume of 7 to 18 micrometers, and a $D_{90}$ particle size by volume of greater than or equal to 20 micrometers;
   wherein the plurality of hexagonal boron nitride agglomerates has a $D_{10}$ particle size by volume of 20 to 50 micrometers, a $D_{50}$ particle size by volume of 50 to 80 micrometers, and a $D_{90}$ particle size by volume of 90 to 140 micrometers.

2. The dielectric composite of claim 1, wherein the dielectric composite has at least one of
   a peel strength to copper of greater than or equal to 0.7 kilograms per centimeter measured in accordance with IPC test method 650, 2.4.8 for copper-clad laminate as-received (AR) or after applying a thermal stress (AS) by heating laminate test specimens to a temperature of 288° C. for 10 seconds;
   a thermal conductivity in the z-axis of greater than or equal to 1.8 watts per meter Kelvin as measured in accordance with ASTM E1461-13 or ASTM D5470-12; or
   a resin flow of 12.5 to 25.5 millimeters as determined by measuring the overflow of partially cured resin which has been b-staged for 3 minutes at 145° C. and pressed at a pressure of 1.4 megapascals and a temperature of 171° C.

3. The dielectric composite of claim 1, wherein the thermoset epoxy resin comprises a residue of at least one of
   an epoxy functional phenol-formaldehyde novolac; or
   a 9,10-dihydro-9-oxa-10-phosphaphenanthrene-10-oxide (DOPO) functional bisphenol A Phenol-Formaldehyde novolac.

4. The dielectric composite of claim 1, wherein the thermoset epoxy resin comprises a residue of a modified with a butadiene-acrylonitrile, for example, that is modified with a carboxyl-terminated butadiene acrylonitrile (CTBN).

5. The dielectric composite of claim 1, wherein the dielectric composite comprises 40 to 50 volume percent percent of the thermoset epoxy resin based on the total volume of the dielectric composite minus the reinforcing fabric.

6. The dielectric composite of claim 1, wherein the fused silica is spherical, having an average particle diameter of 5 to 10 micrometers.

7. The dielectric composite of claim 1, wherein the dielectric composite comprises 0.5 to 2 weight percent of the epoxy silane based on the total weight of the dielectric composite minus the reinforcing fabric.

8. The dielectric composite of claim 1, wherein the dielectric composite comprises 0.001 to 1 weight percent of the accelerator based on the total weight of the dielectric composite minus the reinforcing fabric.

9. The dielectric composite of claim 1, wherein the accelerator comprises at least one of an alkyl-imidazole or an aryl-imidazole.

10. The dielectric composite of claim 1, wherein the dielectric composite comprises 0.1 to 1 weight percent of the de-aerator based on the total weight of the dielectric composite minus the reinforcing fabric.

11. The dielectric composite of claim 1, wherein the dielectric composite comprises the reinforcing fabric in an amount of 5 to 20 weight percent based on the total weight of the dielectric composite.

12. The dielectric composite of claim 1, wherein the reinforcing layer comprises a plain-weave fabric that comprises at least one of E glass fibers or L glass fibers or quartz fibers.

13. The dielectric composite of claim 1, wherein the reinforcing layer comprises a spread-weave fabric that comprises at least one of E glass fibers or L glass fibers or quartz fibers.

14. The dielectric composite of claim 1, further comprising at least one of a curing agent, an additional dielectric filler, or a halogen free flame retardant.

15. The dielectric composite of claim 1, wherein the dielectric composite is a prepreg having a thickness of 1 to 1,000 micrometers; and wherein the thermoset is only partially cured.

16. A multilayer article comprising: a dielectric layer comprising the dielectric composite of claim 1; and at least one electrically conductive layer disposed on a surface of the dielectric layer.

17. A dielectric composite comprising:
  5 to 20 weight percent of a glass reinforcing layer based on the total weight of the dielectric composite;
  40 to 50 volume percent of a thermoset epoxy resin based on the total volume of the dielectric composite minus the glass reinforcing fabric; wherein the thermoset epoxy resin comprises an epoxy functional phenol-formaldehyde novolac and a 9,10-dihydro-9-oxa-10-phosphaphenanthrene-10-oxide (DOPO) functional bisphenol A Phenol-Formaldehyde novolac;
  greater than or equal 40 volume percent of a hexagonal boron nitride based on the total volume of the dielectric composite minus the reinforcing layer;
  3 to 7.5 volume percent of a fused silica based on the total volume of the dielectric composite minus the glass reinforcing layer; wherein the fused silica has an average particle size of 5 to 10 micrometers;
  0.5 to 2 weight percent of an epoxy silane based on the total weight of the dielectric composite minus the glass reinforcing fabric;
  0.001 to 1 weight percent of an aryl-imidazole accelerator based on the total weight of the dielectric composite minus the glass reinforcing fabric; and
  0.1 to 1 weight percent of a de-aerator based on the total weight of the dielectric composite minus the glass reinforcing fabric;
  wherein the hexagonal boron nitride comprising a plurality of hexagonal boron nitride platelets and a plurality of hexagonal boron nitride agglomerates; wherein a volume ratio of the hexagonal boron nitride agglomerates to the hexagonal boron nitride platelets is 1:1.5 to 4:1;
  wherein the plurality of hexagonal boron nitride platelets has a $D_{10}$ particle size by volume of less than or equal to 6 micrometers, a $D_{50}$ particle size by volume of 7 to 18 micrometers, and a $D_{90}$ particle size by volume of greater than or equal to 20 micrometers;
  wherein the plurality of hexagonal boron nitride agglomerates has a $D_{10}$ particle size by volume of 20 to 50 micrometers, a $D_{50}$ particle size by volume of 50 to 80 micrometers, and a $D_{90}$ particle size by volume of 90 to 140 micrometers.

18. A method of making the dielectric composite of claim 1, comprising:
  forming a thermosetting composition comprising an epoxy monomer, a curing agent, the hexagonal boron nitride, the fused silica, the epoxy silane, the accelerator, and the de-aerator;
  coating the reinforcing fabric with the thermosetting composition; and
  at least partially curing the thermosetting composition to form the dielectric composite.

19. The method of claim 18, further comprising laminating the dielectric composite with at least one electrically conductive layer.

20. The method of claim 19, wherein the laminating occurs at a temperature of 100 to 180 degrees Celsius or a pressure of 1 to 3 megapascal for 60 to 120 minutes.

* * * * *